United States Patent
Kroulik

[19]

[11] Patent Number: 5,816,736
[45] Date of Patent: Oct. 6, 1998

[54] ROBOT ARM ASSEMBLY

[75] Inventor: Erwin K. Kroulik, Edmore, Mich.

[73] Assignee: Flex-Cable, Inc., Morley, Mich.

[21] Appl. No.: 821,766

[22] Filed: Mar. 20, 1997

[51] Int. Cl.[6] .................................................. B25G 3/36
[52] U.S. Cl. .................. 403/389; 403/385; 403/DIG. 9; 74/490.02; 248/52; 248/229.14; 248/229.1
[58] Field of Search ................................. 403/389, 385, 403/384, 390, DIG. 9, 344; 74/490.02; 901/28; 285/124.1, 124.5, 12; 248/52, 229.14, 229.1, 229.2, 229.24

[56] References Cited

U.S. PATENT DOCUMENTS

| | | | |
|---|---|---|---|
| 513,630 | 1/1894 | Beard . | |
| 1,093,235 | 4/1914 | Alvord . | |
| 1,835,338 | 12/1931 | Rossman | 403/385 |
| 2,133,197 | 10/1938 | Innocenti | 403/385 |
| 2,351,858 | 6/1944 | Ingalls | 403/389 X |
| 2,912,482 | 11/1959 | Horrocks et al. | 174/146 |
| 3,843,083 | 10/1974 | Angibaud | 248/229.14 |
| 3,961,647 | 6/1976 | Doubleday | 138/103 |
| 4,300,852 | 11/1981 | Clark | 403/385 |
| 4,507,042 | 3/1985 | Suzuki et al. | 414/680 |
| 4,529,352 | 7/1985 | Suzuki et al. | 414/680 |
| 4,659,279 | 4/1987 | Akeel et al. | 414/680 |
| 4,688,961 | 8/1987 | Shioda et al. | 403/389 |
| 4,817,897 | 4/1989 | Kreusel | 403/385 X |
| 4,855,560 | 8/1989 | Sonoda et al. | 219/86.25 |
| 4,901,970 | 2/1990 | Moss et al. | 403/385 X |
| 5,060,961 | 10/1991 | Bontrager | 403/389 X |
| 5,437,207 | 8/1995 | Zimmer | 74/490.02 |
| 5,443,232 | 8/1995 | Kesinger et al. | 248/62 |

Primary Examiner—Kenneth J. Dorner
Assistant Examiner—William L. Miller
Attorney, Agent, or Firm—Taylor & Associates, P.C.

[57] ABSTRACT

The invention is directed to a robot arm assembly including a plurality of elongated elements for attachment with a tool carried by the robot arm assembly. The robot arm assembly includes a robot arm, an arm clamp assembly clamped around the robot arm, and at least one elongated element clamp. The elongated element clamp is connected to a mounting pad on the arm clamp and carries the elongated elements.

11 Claims, 3 Drawing Sheets

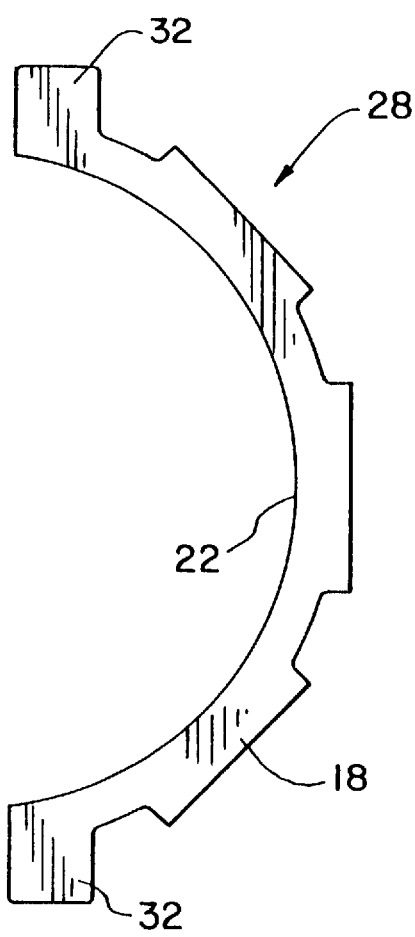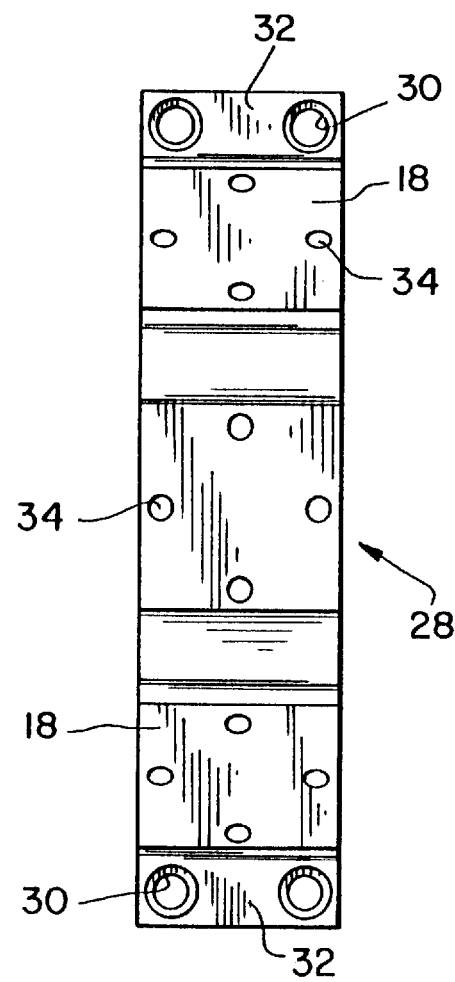
Fig. 3
Fig. 4

ROBOT ARM ASSEMBLY

BACKGROUND OF THE INVENTION

1. Field of the Invention

The present invention relates to a robot arm assembly for organizing and directing electrical cables and fluid conduits associated with a robot arm.

2. Description of the Related Art

A robot arm assembly may include a single clamp extending from a robot arm to guide cables, hoses and the like. The single clamp may include a ring welded to a fastener arm. Cables are passed through the ring and remain confined to the area within the ring.

It is also known to organize and guide a plurality of cables or hoses with a cable retainer assembly. In this arrangement, cables are clamped in grooves by opposing plates such that the cables remain parallel and do not rub together. A problem with this type of cable guide is that it is difficult to securely and quickly attach these clamps and guides to the robot arm. Another problem is that these clamps and guides cannot be easily moved to various locations around the periphery of the robot arm to accommodate changes in the programmed movements of the robot arm. Yet another problem is that these clamps and guides cannot easily be attached to different shapes and sizes of robot arms. An example of such a cable guide is disclosed by U.S. Pat. No. 4,659,279 (Akeel et al.).

What is needed in the art is a system for organizing and directing electrical cables and fluid conduits associated with a robot arm that is easy to assemble, securely fastens to different shapes and sizes of robot arms, can be attached to various sides of the robot arms to accommodate changes in the programmed movements of the robot arm, and can hold a large number of cables and conduits at the same point along the length of the robot arm.

SUMMARY OF THE INVENTION

The present invention provides a robot arm assembly for organizing and directing a plurality of electrical cables and fluid conduits associated with a robot arm.

The invention comprises, in one form thereof, a robot arm assembly including a plurality of elongated elements for attachment with a tool carried by the robot arm assembly. The robot arm assembly includes a robot arm, an arm clamp assembly clamped around the robot arm, and at least one elongated element clamp. The elongated element clamp is connected to a mounting pad on the arm clamp and carries the elongated elements.

An advantage of the present invention is that the arm clamp assembly may be securely and quickly attached to the robot arm. The two identical, symmetrical half arm clamps which make up the arm clamp assembly mate around the robot arm and exert a grasping force which can be adjusted to the desired level. The symmetry and substantially identical form of the half arm clamps allows for greater interchangability of parts and assembly with less regard for the orientation of the half arm clamps.

Another advantage is that the elongated element clamp can be easily moved to various mounting pads around the periphery of the arm clamp assembly, and thereby to various locations around the outer surface of the robot arm to accommodate changes in the programmed movements of the robot arm.

Yet another advantage is that by virtue of the multiple mounting pads around the periphery of the arm clamp assembly, multiple elongated element clamps, each carrying at least one elongated element, may be attached to the arm clamp assembly at the same point along the length of the robot arm.

A further advantage is that the arm clamp assembly can easily be attached to different shapes and sizes of robot arms by virtue of the bushing disposed between and interconnecting the inner surface of the arm clamp assembly and the outer surface of the robot arm.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is a side view of the half arm clamp shown in FIGS. 1 and 2;

FIG. 4 is plan view of the half arm clamp of FIGS. 1–3; and

Corresponding reference characters indicate corresponding parts throughout the several views. The exemplification set out herein illustrate one preferred embodiment of the invention, in one form, and such exemplification is not to be construed as limiting the scope of the invention in any manner.

DETAILED DESCRIPTION OF THE INVENTION

Figure 1:
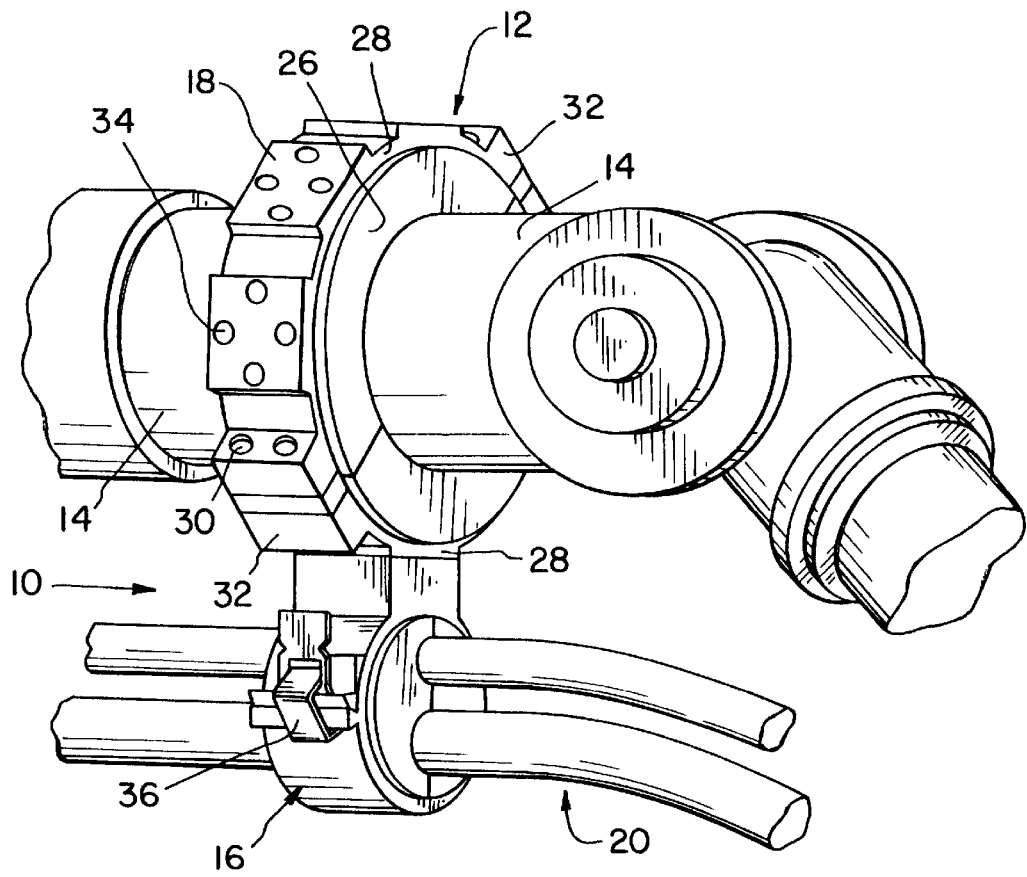
FIG. 1 is a perspective view of one embodiment of a robot arm assembly of the present invention.
Figure 2:
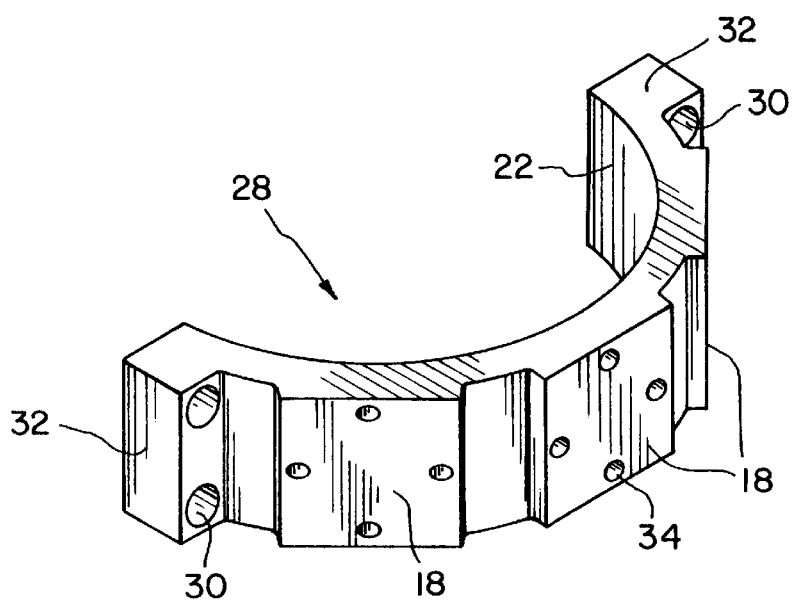
FIG. 2 is a perspective view of a half arm clamp of the arm clamp assembly of FIG. 1.

Referring now to the drawings and particularly to FIG. 1, there is shown a robot arm assembly 10 including an arm clamp assembly 12, a robot arm 14 and an elongated element clamp 16.

Figure 5:
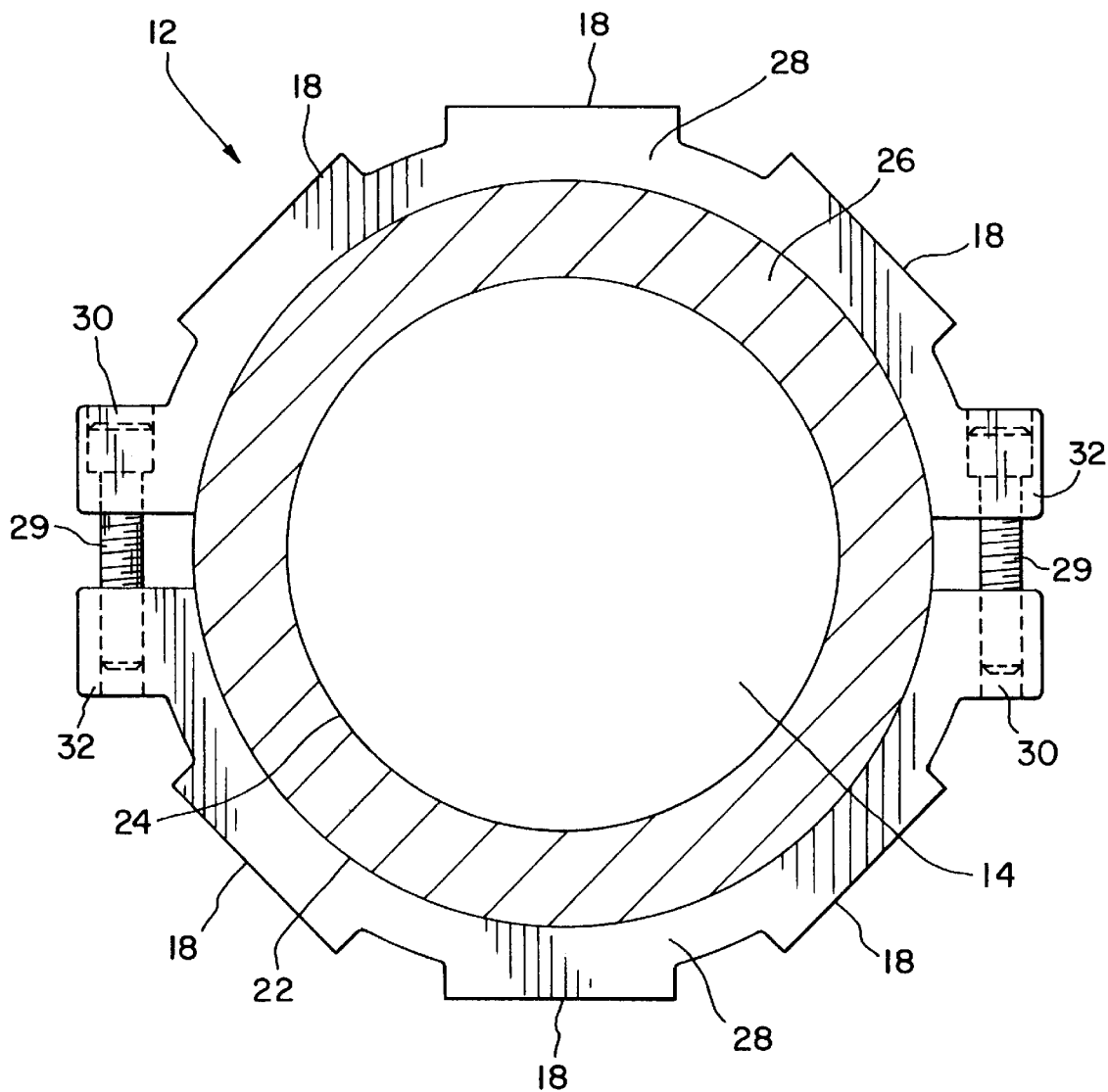
FIG. 5 is a side sectional view of the robot arm assembly of FIG. 1, with a bushing between the inner surface of the arm clamp assembly and the outer surface of the robot arm.

Arm clamp assembly 12 (FIGS. 1–5) includes cylindrical inner surface 22 which wraps around and grasps the cylindrical outer surface 24 (FIG. 5) of robot arm 14. Arm clamp assembly 12 includes on its periphery a plurality of mounting pads 18. Mounting pads 18 have flat surfaces and are equidistantly spaced between ends 32. Each mounting pad 18 includes a plurality of holes 34 to receive corresponding fasteners such as bolts (not shown) passing through elongated element clamp 16, thereby attaching elongated element clamp 16 to arm clamp assembly 12.

Arm clamp assembly 12 includes two identical, symmetrical half arm clamps 28 which are bolted together using bolts 29 (FIG. 5) passing through threaded bolt holes 30 at both ends 32 to form arm clamp assembly 12 shown in FIG. 1. Each half arm clamp 28 exerts a grasping force on bushing 26, and, in turn, robot arm 14. Each half arm clamp 28 is symmetrical about two different planes which divide it into four symmetrical quadrants. The first plane is equidistant from the two ends and bisects half arm clamp 28. The second plane runs through both of the two ends, the inner surface and the periphery, and bisects half arm clamp 28.

An elongated element clamp 16 carries at least one elongated element 20 which attaches to or is used in association with a tool carried by robot arm 14. A plurality of elongated element clamps 16 may be attached to a respective mounting pad 18. Elongated element clamp 16 shown in FIG. 1 includes a clam shell arrangement wherein two elongated elements 20 are retained. Fastener 36 is latched to hold elongated element clamp 16 closed. Elongated element (s) 20 may be in the form of electric cables, wires, hydraulic hoses and fluid conduits or the like.

An optional bushing 26 is disposed between and interconnects inner surface 22 of arm clamp assembly 12 and outer surface 24 of robot arm 14. Bushing 26 may be formed from a compressible material to ensure that arm clamp assembly 12 exerts a tight, secure grasping force on robot arm 14 when the inside diameter of arm clamp assembly 12 exceeds the outside diameter of robot arm 14, or when robot arm 14 has a non-circular cross section.

In the embodiment shown in the drawings, inner surface 22 of arm clamp assembly 12 and outer surface 24 of robot arm 14 are generally cylindrically shaped. However, it is to be understood that arm clamp assembly 12 and robot arm 14 could be other than cylindrically shaped. For example, arm clamp assembly 12 could be shaped to conform to non-cylindrically shaped robot arm 14. Alternatively, compressible bushing 26 could accommodate an irregularly shaped robot arm 14.

Moreover, different kinds of elongated element clamps 16 other than the clam shell type shown could be used. For instance, elongated elements 20 could be passed through a single or several attached retainer rings.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A robot arm assembly including a plurality of elongated elements for attachment with a tool configured to be carried by said robot arm assembly, said robot arm assembly comprising:

a robot arm;

an arm clamp assembly being clamped around said robot arm, said arm clamp assembly having a periphery and a plurality of mounting pads equidistantly spaced on said periphery; and at least one elongated element clamp attached to a corresponding said mounting pad, said at least one elongated element clamp being configured to carry at least one of the elongated elements.

2. A robot arm assembly, comprising:

a robot arm;

an arm clamp assembly being clamped around said robot arm, said arm clamp assembly having a periphery and a plurality of mounting pads in spaced apart relation on said periphery;

at least one elongated element clamp attached to a corresponding said mounting pad; and a plurality of elongated elements carried by said at least one elongated element clamp, each said elongated element respectively comprising one of an electrical cable, an electrical wire, a hydraulic hose and a fluid conduit.

3. The robot arm assembly of claim 2, wherein said arm clamp assembly has an inner surface and said robot arm has an outer surface, said inner surface exerting a grasping force on said robot arm.

4. The robot arm assembly of claim 3, further comprising a bushing disposed between and interconnecting said inner surface of said arm clamp assembly and said outer surface of said robot arm.

5. The robot arm assembly of claim 3, wherein said inner surface and outer surface are generally cylindrical in shape.

6. The robot arm assembly of claim 2, wherein said plurality of mounting pads are on the periphery of said arm clamp assembly.

7. The robot arm assembly of claim 2, wherein said arm clamp assembly comprises two half arm clamps, each of said half arm clamps being substantially identical and having two ends, said half arm clamps being joined together at said ends.

8. The robot arm assembly of claim 7, wherein said ends include at least one bolt hole.

9. The robot arm assembly of claim 8, wherein said two substantially identical half arm clamps are joined together with at least one bolt projecting through a respective said bolt hole.

10. The robot arm assembly of claim 8, wherein said at least one bolt hole is threaded.

11. The robot arm assembly of claim 2, wherein said plurality of mounting pads are flat.

\* \* \* \* \*